Patented May 19, 1931

1,806,152

UNITED STATES PATENT OFFICE

HARRY B. DYKSTRA AND WALTER E. LAWSON, OF WILMINGTON, DELAWARE, ASSIGNORS TO E. I. DU PONT DE NEMOURS & COMPANY, OF WILMINGTON, DELAWARE, A CORPORATION OF DELAWARE

COMPOSITION OF MATTER

No Drawing.   Application filed July 9, 1928.   Serial No. 291,485.

This invention relates to compositions of matter and coating compositions and particularly those containing polymerized vinyl esters.

Vinyl ester polymers and vinyl chloride polymers, in particular, have been used in coating compositions with the addition of certain materials as softeners therefor. We have discovered that the materials previously employed as softeners, such as camphor, chlorinated hydrocarbons, chlornaphthalene, phenolphosphates, naphtholphosphates and cresolphosphates produce films which do not remain soft and flexible, but become brittle within a very short time, such as one or two weeks.

We have found that ethers of polyalcohols, such as dibenzylin and tribenzylin, which are the dibenzyl and tribenzyl ethers of glycerin, are valuable softening compounds. Dibenzylin is a water white liquid, practically odorless, and boils at 195 to 200° C. under 6 mm. pressure.

It is, therefore, an object of this invention to provide compositions of matter and coating compositions which are non-brittle.

With the above and other objects in view, which will be apparent as the description proceeds, we have set forth below several illustrative embodiments of our invention.

Example 1

We may add 1 part of dibenzylin to a solution of 3 parts of the alpha polymer of vinyl chloride in 20 parts of a solvent composed of 80 per cent ethyl acetate and 20 per cent butyl acetate. The solution is permitted to flow out on a glass plate, and the solvents allowed to evaporate, producing a film of exceptional softness and flexibility.

Example 2

We may add 10 parts by weight of the alpha polymer of vinyl chloride to 3 parts by weight of tribenzylin in 87 parts of a solvent composed of 50% ethyl acetate and 50% butyl acetate. A clear, tough and exceptionally flexible film is secured from this mixture.

Example 3

We may make up a mixture consisting of vinyl chloride, alpha polymer, 10 parts by weight, dibenzylin 3 parts by weight, and 87 parts by weight of a solvent consisting of 50% ethyl acetate and 50% butyl acetate. A flexible and clear, tough film is procured.

Example 4

We have found that tribenzylin is an exceptionally good softener for vinyl acetate polymers and mixtures of vinyl acetate polymers with vinyl chloride polymers. For example, to 10 parts by weight of vinyl acetate polymer we may add 3 parts by weight of tribenzylin, and employ 87 parts by weight of a solvent consisting of 50% butyl acetate and 50% ethyl acetate.

Example 5

Compositions may be formulated embodying suitable spraying characteristics for use as lacquers. As an example of this, to 18 parts by weight of vinyl chloride, alpha polymer, we may add 5.4 parts by weight of tribenzylin and 100 parts by weight of a solvent, the solvent consisting of acetone 20%, ethyl acetate 20%, butyl acetate 25%, chlorbenzene 25% and hexalin acetate 10%.

Example 6

Pigmented spraying enamels or lacquers may also be made. We have found, for example, that a suitable pigmented enamel may be made from the following composition:

| | Parts by wt. |
|---|---|
| Vinyl chloride, alpha polymer | 16.5 |
| Polymerized vinyl acetate | 5.5 |
| Dibenzylin | 4.4 |
| Solvent—consisting of | 100 |
| Acetone | 15% |
| Ethyl acetate | 25% |
| Amyl acetate | 25% |
| Chlorbenzene | 25% |
| Acetate of monoethyl ether of glycol | 10% |

We have found it convenient to incorporate a pigment, such as titanox, by grinding in a suitable ball or pebble mill with a mill base. The mill base we have found convenient to use consists of a portion, say 50%, of the vinyl chloride polymer, vinyl acetate polymer, softener mixture dissolved in a suitable amount of solvent. When the pigment is thoroughly incorporated, the mill base is later diluted with the remainder of the ingredients.

Although we have emphasized the use of ethers of polyalcohols, such as dibenzylin and tribenzylin, as softeners for vinyl chloride polymers and mixtures thereof, our discovery is not limited to these as ethers of polyalcohols are suitable softeners for other vinyl ester polymers, such as polymerized vinyl acetate and mixtures of polymerized vinyl acetate with polymerized vinyl chloride.

Examples of ethers of other polyalcohols to which our invention is applicable include ethers of pentaerythrite and sorbitol.

In connection with compounds containing hydroxyl groups in addition to ether groups, we have found that the plasticizing properties increase with the ratio of ether groups to hydroxyl groups, and, in general, we prefer to use those compounds in which the ratio of ether groups to hydroxyl groups is not less than two to one.

Films containing ethers of polyalcohols, such as dibenzylin, retain their flexibility and toughness for a much longer period of time than films containing any of the softeners previously employed for this purpose.

As many apparently widely different embodiments of this invention may be made without departing from the spirit thereof, it is to be understood that we do not limit ourselves to the foregoing examples or descriptions except as indicated in the following patent claims.

We claim:

1. A composition of matter containing a vinyl ester polymer and a poly-benzyl ether of a polyalcohol.

2. A composition of matter containing a vinyl chloride polymer and a poly-benzyl ether of a polyalcohol containing hydroxyl groups in addition to ether groups in which the ratio of ether groups to hydroxyl groups is not less than two to one.

3. A composition of matter containing a vinyl ester polymer and a polybenzyl ether of glycerine.

4. A composition of matter containing a vinyl chloride polymer and a polybenzyl ether of glycerine.

5. A composition of matter containing a vinyl ester polymer and dibenzylin.

6. A composition of matter containing a vinyl chloride polymer and dibenzylin.

7. A composition of matter containing a vinyl chloride polymer, a solvent therefor, and dibenzylin.

8. A composition of matter containing a mixture of vinyl ester polymers and a polybenzyl ether of glycerine.

9. A composition of matter containing a vinyl chloride polymer, a vinyl acetate polymer, and a polybenzyl ether of glycerine.

10. A composition containing a vinyl ester polymer and tribenzylin.

11. A composition containing a vinyl chloride polymer and tribenzylin.

In testimony whereof we affix our signatures.

HARRY B. DYKSTRA.
WALTER E. LAWSON.